Aug. 7, 1956  J. M. MAXWELL  2,757,686
SUCTION FLOW DEVICE
Filed July 30, 1954  2 Sheets-Sheet 1
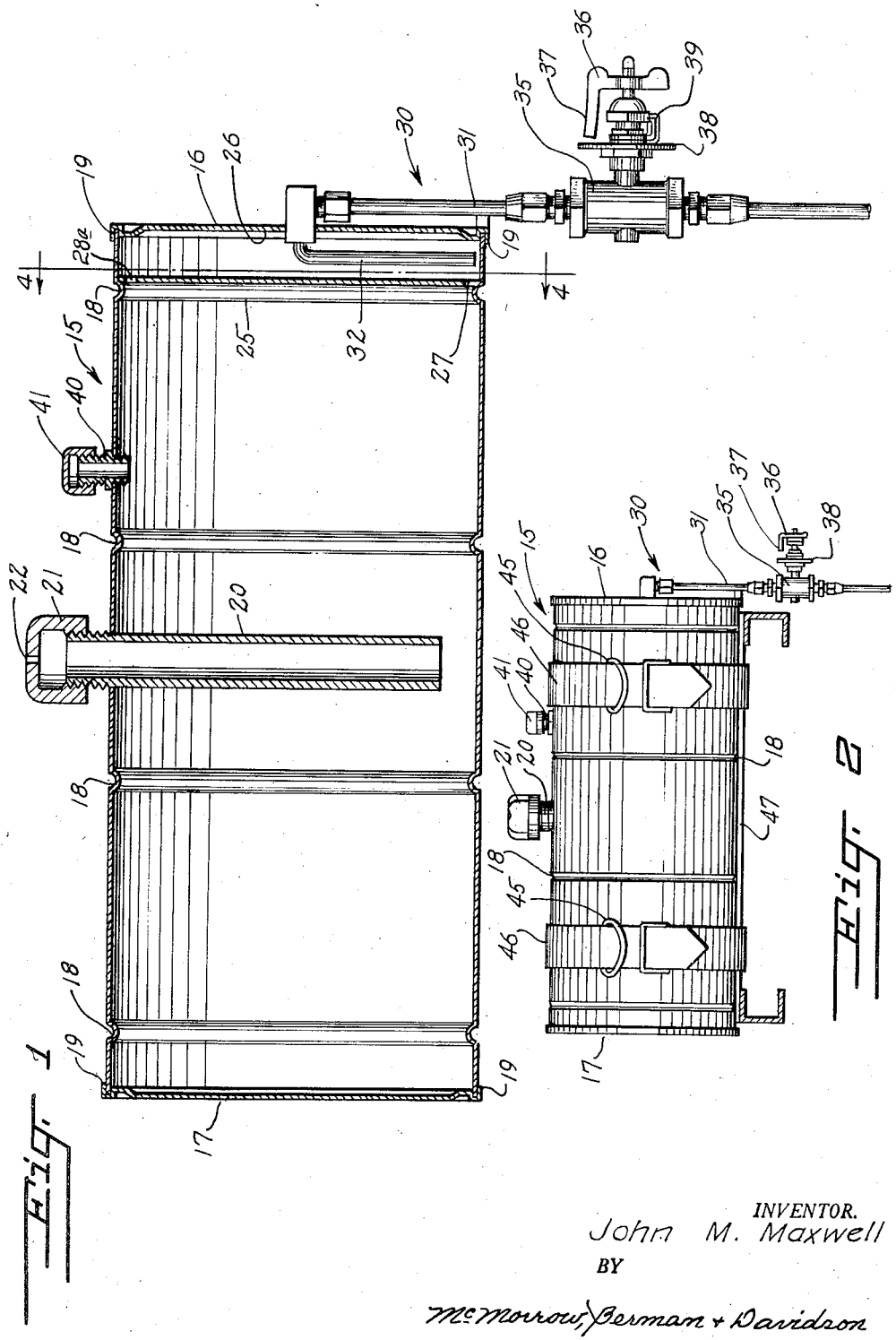
INVENTOR.
John M. Maxwell
BY
McMorrow, Berman & Davidson
ATTORNEYS Aug. 7, 1956 J. M. MAXWELL 2,757,686
SUCTION FLOW DEVICE
Filed July 30, 1954 2 Sheets-Sheet 2
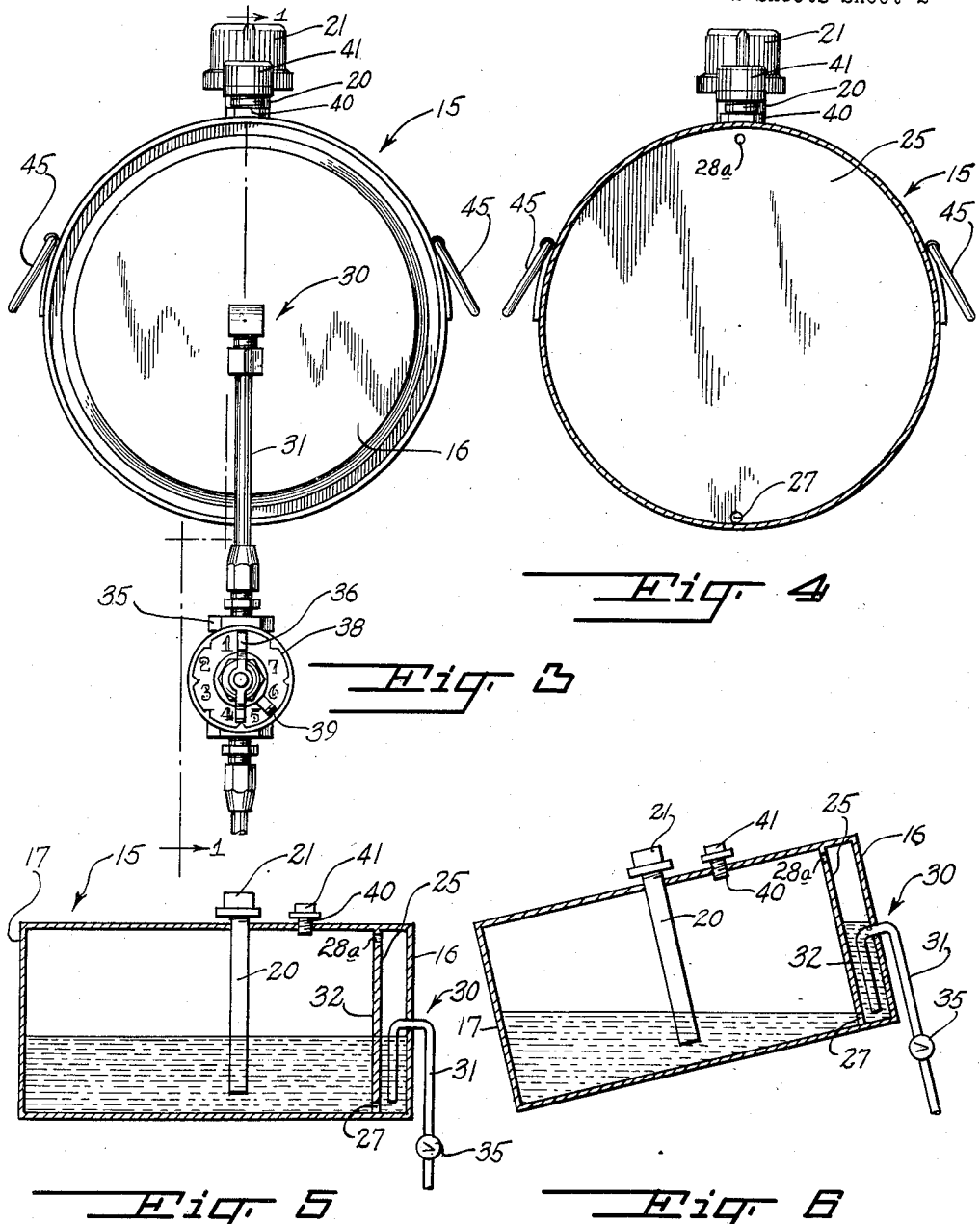
INVENTOR.
John M. Maxwell
BY
McMorrow, Berman & Davidson
ATTORNEYS

United States Patent Office 2,757,686
Patented Aug. 7, 1956

2,757,686

SUCTION FLOW DEVICE

John M. Maxwell, Raleigh, N. C.

Application July 30, 1954, Serial No. 446,697

2 Claims. (Cl. 137—574)

This invention relates to suction flow devices.

An object of the invention is to provide a suction flow device for dispensing liquid from a tank, which device is adapted to dispense said liquid at a constant rate, regardless of tilting movements of the tank or the diminishing level of the contents of the tank.

Another object of the invention is to provide a suction flow device for farm use which is of simple and sturdy construction, which is adjustable to different rates of flow, and which is adapted to be mounted upon a farm vehicle.

Other objects and advantages of the invention will appear from the following description considered in conjunction with the attached drawings in which:

Figure 1 is a side elevational view, in section, of the device of the present invention;

Figure 2 is a side elevational view of the device of the present invention, on a reduced scale, as mounted upon a support;

Figure 3 is an end elevational view of the device of the present invention;

Figure 4 is a view taken along the line 4—4 of Figure 1;

Figure 5 is a diagrammatic view of the device of the present invention, showing the position of liquid contained therein when the device is in a level position, and Figure 6 is a view of the assembly of Figure 5, showing the position of liquid contained therein when the device is in a tilted position.

Referring to the drawings, the reference numeral 15 designates a horizontally disposed tank having closed ends 16 and 17. The tank 15 is provided with spaced, annular, reinforcing grooves 18 and the ends 16 and 17 are grooved, as shown at 19, to receive the end edges of the wall of the tank 15.

A vertically disposed pipe 20 extends through the wall of the tank 15, intermediate the closed ends 16 and 17 and has one end exteriorly of the wall of the tank 15 and the other end contiguous to and spaced from the inner surface of the opposite adjacent portion of the wall of the tank 15. The exteriorly extending portion of the pipe 20 is externally threaded and closed by a cap 21 having a venthole 22 therethrough.

Within the tank 15 and in parallel spaced relation with respect to the closed end 16, is a partition 25 which forms, with the adjacent portion of the wall of the tank 15 and the end 16, a closed chamber 26. The partition 25 has an opening 27 in the portion thereof adjacent the inner end of the pipe 20, the opening 27 affording communication between the chamber 26 and the interior of the tank 15. The partition 25 is also provided with an opening 28a adjacent the top thereof for permitting the entrained air to flow into the upper portion of the tank 15.

An inverted U-shaped tube, generally designated 30, having one leg 31 longer than the other leg 32, is positioned so that the shorter leg 32 is within the closed chamber 26 with its open end adjacent the opening 27 and with the bight of the tube 30 extending transversely through and supported in the closed end 16. The longer leg 31 of the tube 30 is exteriorly of the tank 15 and has its free end spaced below the free end of the leg 32. The tube 30 thus constitutes a siphon.

In the longer leg 31 of the tube 30, is a manually controlled metering valve 35 for regulating the discharge of fluid from the leg 31. Exteriorly of the metering valve 35 is a handle 36 for actuating the valve 35. The handle 36 has a portion 37 which projects toward the valve 35 and serves as a dial pointer. A circular dial 38 is interposed between the free end of the pointer 37 and the valve 35 and carries dial markings, on the face adjacent the pointer 37, which may be read with respect to the pointer 37 to indicate the setting of the valve 35. An abutment 39 projects outwardly from the face of the dial 38 into the path of movement of the pointer 37 and may be set at any selected angle with respect to the dial 38 to serve as a stop for the opening movement of the valve handle 36.

Projecting through the segment of the wall of the tank 15 through which the pipe 20 extends, and intermediate the pipe 20 and the partition 25, is a vertically disposed vent pipe 40, the exterior end of which is closed by a screw cap 41.

The tank 15 may be provided with handle loops 45 arranged in spaced relation along the wall of the tank 15, as shown in Figure 2. The tank 15 may be secured upon a farm vehicle or other support having a horizontally disposed bar or beam 47 thereon, by straps 46 placed through the handle loops 45 and cinched about the tank 15 and the bar 47, as indicated in Figure 2.

To use the suction flow device of the present invention, the tank 15 is arranged in a horizontal position and the caps 21 and 41 are removed. The liquid to be dispensed is then poured into the tank through the pipe 20, the air in the tank escaping through the vent pipe 40 as the liquid enters. When the tank is filled, the cap 21 is replaced, and the cap 41 is turned down on the vent pipe 40 so as to tightly seal the vent pipe. The tank may be grasped by the handle loops 45 and moved to the position it will occupy in use, as for example, upon the body of a farm vehicle. The tank 15 will always be mounted in a horizontal position and may be connected to its support by means of the straps 46, as shown in Figure 2.

When the operator is ready to dispense the liquid contained in the tank 15, he turns the valve handle 36 to open the valve 35 to the desired extent, having first fixed the abutment 39 upon the dial 38 so as to prevent the turning of the handle 36 beyond the desired point.

When the valve 35 is opened, the liquid flows out of the tank 15 through the tube 30 at a constant rate determined by the setting of the valve 35 and the level of the liquid in the tank 15 falls. After the liquid in the tank falls below the level of the bight of the tube 30, the tube 30 becomes a siphon and continues to discharge the liquid from the tank 15 at the established rate of flow, so long as the open end of the leg 32 remains covered by the liquid. When a tank equipped with a discharge siphon is mounted upon a vehicle and subjected to the tilting movements of the vehicle, any tilting movement which causes the liquid to leave the free end of the leg 32, even momentarily, is sufficient to stop the action of the siphon and make priming necessary to start it again. In the device of the present invention, however, the partition 25 acts to prevent such stoppage by trapping the liquid in the chamber 26, during all normal tilting movements of the tank resulting from the passage of the supporting vehicle over rough ground, for a sufficient period of time to keep the free end of the leg 32 covered, as shown in Figures 5 and 6. Thus, the liquid continues to be discharged from the tank at an even rate, in spite of the movements of the supporting vehicle, until the level of the liquid in the tank 15 falls below the open end of the leg 32 of the tube 30, at which time the operation of the device must be stopped and the tank refilled in any event.

It is to be noted that the pipe 20 is not only for filling purposes but because it extends to near the wall of the tank 15 also serves as a vacuum control over the liquid contained in the tank by causing the air to flow down the pipe and bubble back through the liquid to permit the siphon tube 30 to function.

What is claimed is:

1. A suction flow device comprising a horizontally disposed tank having closed ends, a vertically disposed pipe extending through the wall of said tank intermediate the closed ends thereof and having one end exteriorly of said tank wall and having the other end contiguous to and spaced from the inner surface of the opposite adjacent portion of the said tank wall, a partition within and in parallel spaced relation with respect to one of the closed ends of said tank and forming with the adjacent portion of said tank wall and said one end a closed chamber, said partition having an opening affording communication between said chamber and the interior of said tank, said opening being in the portion of said partition adjacent the other end of said pipe, an inverted U-shaped tube having one leg longer than the other positioned so that the shorter leg is within said closed chamber with its open end adjacent the partition opening and having its bight extending transversely through and supported in said one closed end, the longer leg of said tube being exteriorly of said tank and having its free end spaced below the free end of said shorter leg, and a manually controlled metering valve in the longer leg of said tube for regulating the discharge of fluid from said leg.

2. A suction flow device comprising a horizontally disposed tank having closed ends, a vertically disposed pipe extending through the wall of said tank intermediate the closed ends thereof and having one end exteriorly of said tank wall and having the other end contiguous to and spaced from the inner surface of the opposite adjacent portion of the said tank wall, a partition within and in parallel spaced relation with respect to one of the closed ends of said tank and forming with the adjacent portion of said tank wall and said one end a closed chamber, said partition having an opening affording communication between said chamber and the interior of said tank, said opening being in the portion of said partition adjacent the other end of said pipe, an inverted U-shaped tube having one leg longer than the other positioned so that the shorter leg is within said closed chamber with its open end adjacent the partition opening and having its bight extending transversely through and supported in said one closed end, the longer leg of said tube being exteriorly of said tank and having its free end spaced below the free end of said shorter leg, a manually controlled metering valve in the longer leg of said tube for regulating the discharge of fluid from said leg, and a vertically disposed vent pipe extending through said tank wall intermediate said partition and the other end of said tank.

References Cited in the file of this patent

UNITED STATES PATENTS

| | | |
|---|---|---|
| 1,707,058 | Kauwertz | Mar. 26, 1929 |
| 2,664,911 | Thompson | Jan. 5, 1954 |
| 2,685,303 | Tolley | Aug. 3, 1954 |